Sept. 24, 1957 L. V. McCARTY ET AL 2,807,422
THERMOSTATIC MODULATING AND SNAP-ACTING GAS CONTROL VALVE
Filed Dec. 26, 1952 3 Sheets-Sheet 1

INVENTORS
LOURDES V. McCARTY
RENO L. VICENZI
BY *John W. Michael*
ATTORNEY

Sept. 24, 1957  L. V. McCARTY ET AL  2,807,422
THERMOSTATIC MODULATING AND SNAP-ACTING GAS CONTROL VALVE
Filed Dec. 26, 1952  3 Sheets-Sheet 2

INVENTORS
LOURDES V. McCARTY
RENO L. VICENZI
BY
ATTORNEY

*INVENTORS*
LOURDES V. McCARTY
RENO L. VICENZI

BY *John W. Michael*

ATTORNEY

United States Patent Office 2,807,422
Patented Sept. 24, 1957

2,807,422

THERMOSTATIC MODULATING AND SNAP-ACTING GAS CONTROL VALVE

Lourdes V. McCarty and Reno L. Vicenzi, Milwaukee, Wis., assignors, by mesne assignments, to Controls Company of America, Schiller Park, Ill., a corporation of Delaware Application December 26, 1952, Serial No. 328,036

2 Claims. (Cl. 236—48)

This invention relates to a thermostatically regulated gas control valve and to the conversion unit employed in converting a manually controlled valve to thermostatic regulation.

The co-pending Johnson et al. application Serial No. 160,268, now Patent No. 2,683,565, discloses a manual gas control which may be modified, by the addition of various conversion units, to a manual control provided with a "safety pilot" valve and to a fully automatic gas valve including the safety pilot control, a pressure regulator and means for regulating flow through the valve in accordance with temperature at a remote position where a room thermostat is located. The present unit is adapted for use with the basic manual control valve disclosed in said application to convert the valve to thermostatic regulation by mechanical means responsive to ambient temperature.

It is well understood that a burner, after being ignited, may be modulated between a high or maximum fire and a low fire which is the minimum fire which may be sustained. Controls have been provided for this purpose in the past but have required manual shut-off if the heat output at low fire was excessive. It is desirable to provide for automatic shut-off under these circumstances and, while the shut-off action must be a snap action, the solution to the problem would not be difficult were it not for the fact that the necessary subsequent snap-on action later requires a flow rate in excess of the low-fire rate in order to obtain safe ignition. Therefore, the snap-action of the valve opening movement must be greater than the snap-off movement. The present control accomplishes these functions and makes possible the regulation of a single valve to modulate, turn off, and turn on the gas flow in accordance with the temperature of the heated space. The present valve modulates the flow between high and low fire with variations in the response temperature and snaps from "low" to "off" if the response temperature rises above a predetermined temperature. When the response temperature drops again to a predetermined temperature the valve snaps from "off" to "on" to provide a flow rate in excess of the low fire rate to secure good ignition. This ignition rate may be the maximum rate or may be fifty percent of the maximum rate for example. The present control effects this operation by modifying the action imparted to a control lever by a temperature responsive bellows system to cause the bellows to build up force sufficient to move from "low fire" to "off" prior to initiating the closing movement of the control lever to thus secure a snap action and to cause the bellows to build up sufficient force before the control lever leaves the "off" position to snap the lever to a relatively high flow rate position.

The principal object of this invention is to provide a snap-on, snap-off gas control valve having a modulating action between high and low fire.

Another object is to provide a control for gas valves which modulates the valve between high and low fire, snaps off from low fire, and snaps on from off to a flow rate greater than the low fire rate.

A further object is to provide a control having the described operating characteristics and which may be mounted on a basic manual gas valve unit to convert the basic unit to automatic operation.

Other objects and advantages will be pointed out in, or be apparent from, the specification and claims, as will obvious modifications of the single embodiment shown in the drawings, in which:

Figure 1:
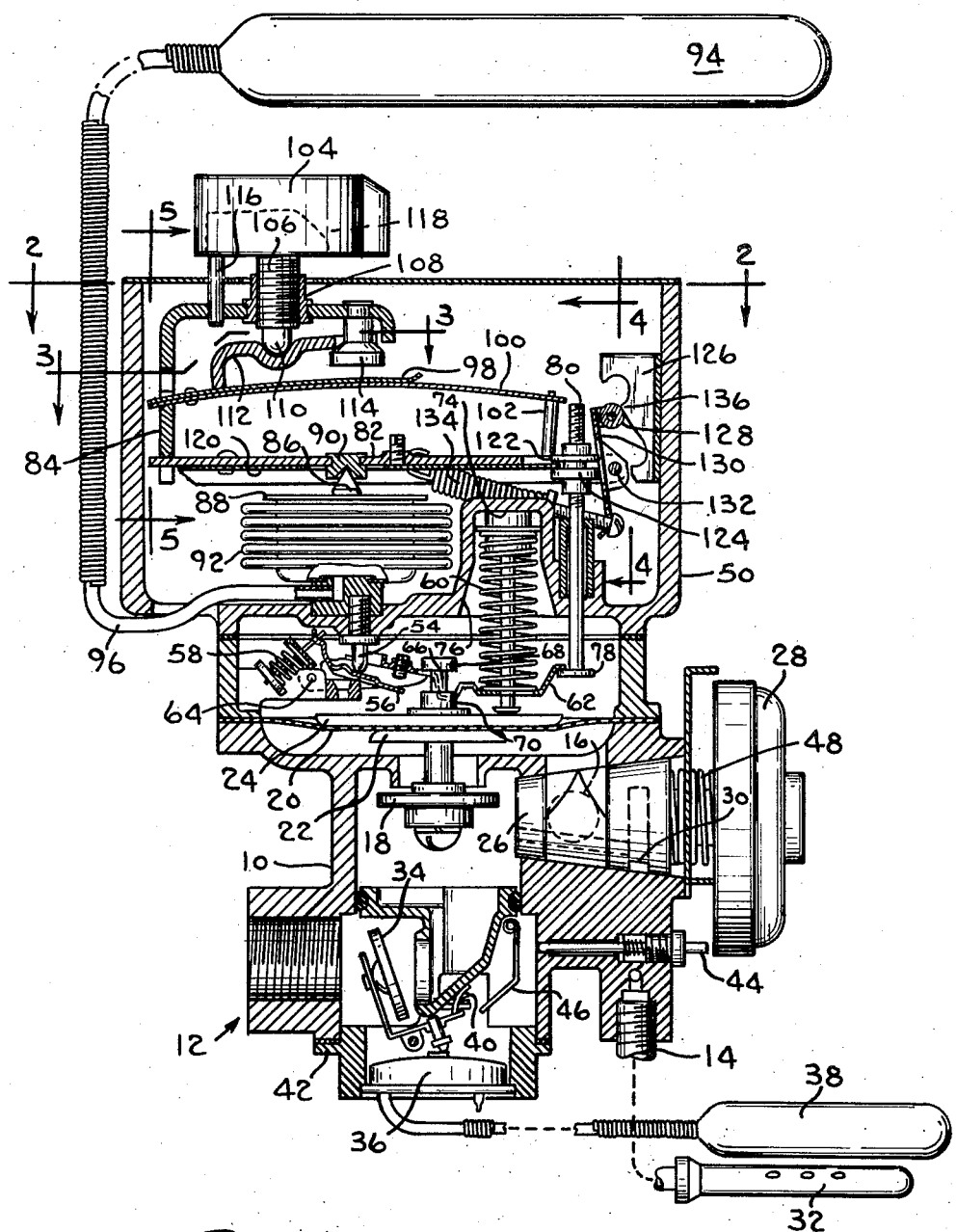
Fig. 1 is a vertical section through the conversion top and the gas valve.
Figure 2:
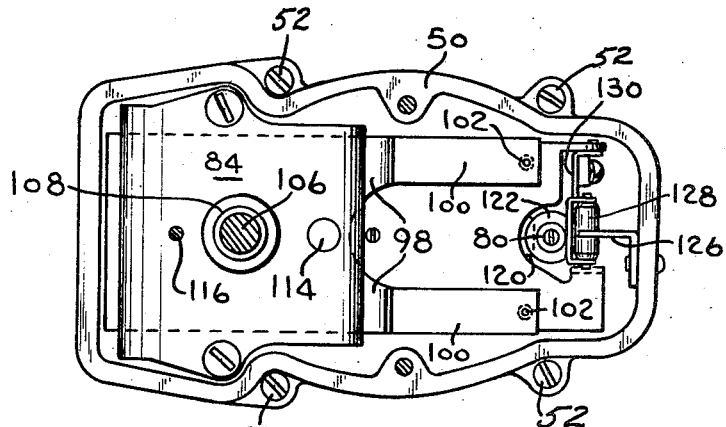
Fig. 2 is a top view as indicated by line 2—2 in Fig. 1.
Figures 3, 4:
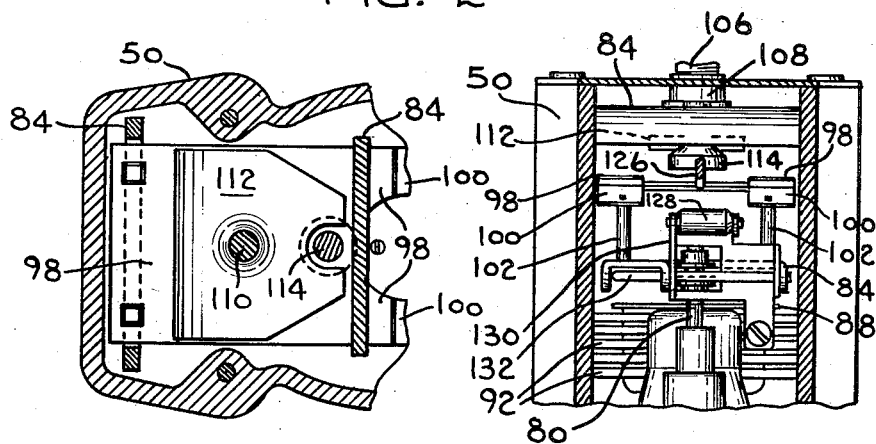
Fig. 3 is a fragmentary section taken on line 3—3 in Fig. 1.
Fig. 4 is a partial end view taken from line 4—4 in Fig. 1.
Figure 5:
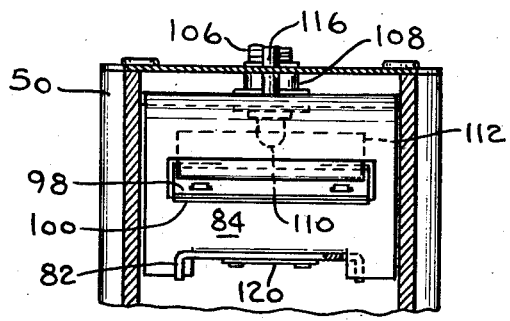
Fig. 5 is a view taken from line 5—5 of Fig. 1.

Referring to the drawings in detail, the control valve comprises a body 10 having an inlet 12, a pilot burner outlet 14, and a main burner outlet 16. Valve 18 carried by diaphragm 20 is adapted to regulate the outlet pressure which acts on the bottom of diaphragm 20 and is opposed by spring 60 and the weight of the valve and metal plates 22, 24 carried on either side of diaphragm 20. Flow from the chamber on the outlet side of valve 18 to the main burner is regulated by plug valve 26 actuated by knob 28. When plug valve 26 is in the position shown in Fig. 1, flow to the main burner passes through the plug valve to outlet 16 at the regulated pressure. Flow to the pilot burner by-passes the pressure regulator valve and flows axially through the plug valve into peripheral groove 30 which is connected to pilot burner 32 by outlet 14 and suitable conduits. Flow to the main burner may be cut off entirely by plug valve 26 while flow to the pilot burner is maintained. Further details of this structure may be seen in said Johnson et al. application and are not considered important with respect to the present invention.

When it is desired to convert the valve to automatic operation in response to thermostatic demand for heat as shown in said Johnson et al. application or when converting to automatic operation by means of the present device, it is preferable to provide the control with a safety pilot valve 34 which is held open by diaphragm 36 when charged feeler bulb 38 is heated by the pilot flame. If the pilot burner should be extinguished, bulb 38 cools and diaphragm 36 collapses to allow spring 40 to return valve 34 to its seat and cut off the flow to the main and pilot burners. It may be noted that the safety valve 34 is carried by a sub-assembly 42 which may be inserted into the inlet chamber as shown. Upon properly positioning knob 28, the knob may be moved to the left to push pin 44 inwardly and cock arm 46 to open valve 34 and establish flow to the pilot burner to permit ignition of the pilot. Upon release of knob 28 spring 48 moves the knob outwardly to permit pin 44 to return to its normal position and allow safety valve 34 to close in absense of the flame at the pilot burner.

The present conversion top is adapted to be mounted on top of valve body 10 above diaphragm 20 to regulate movement of pressure regulating valve 18. The conversion top includes a housing 50 which is mounted on the body 10 by means of screws 52 and is provided with a depending pin 54 which acts on lever 56 to render spring 58 inoperative at all times. Spring 58 and lever 56 have no function in the present unit and are functional only in connection with the thermostatic unit shown in said Johnson et al. application. With spring 58 inoperative compressed spring 60 is free to bias lever 62, pivoted on pin 64, downwardly in the valve opening direction so valve 18 may regulate pressure by virtue of the freedom of movement between valve stem 66 and lever 62 obtained by means of spaced shoulders 68, 70 on the stem and engaging with lug 72 on lever 62. Spring 60 is carried by lever 62 and compressed between the lever and seat 74 in well 76 cast in housing 50.

With lever 62 in the position shown in Fig. 1 it will be appreciated that if the pressure on the underside of diaphragm 20 decreases, the weight of pads 22, 24 (the bias of spring 60 holds lever 62 against head 78 on pin 80 under the illustrated conditions) will cause valve 18 to open to the limit determined by contact between lug 72 and the upper stem shoulder 68. The position of lever 62 determines the range of movement available to the valve 18 and therefore determines the amount of gas which will be passed as well as the regulated pressure of the gas passed. The lever position is dependent upon the position of head 78 on pin 80 in all positions except the high fire position in which spring 60 will compress to some extent and act to regulate pressure along with pads 22, 24. The above assumes, of course, that plug valve 26 is open so that gas flow is regulated solely by valve 18.

The position of head 78 is determined by the position of lever 82 fulcrumed at its left end on bracket 84 mounted in the housing 50. Push pin 86 carried by cup 88 acts on lever socket 90 to move the control lever as bellows 92 flexes in accordance with the temperature sensed by bulb 94 connected to the bellows by capillary tube 96. The bellows and bulb are vapor charged to flex as the temperature changes. The force of springs 98, 100 may be adjusted by turning knob 104 to raise or lower the knob stem 106 threaded in bushing 108 carried by bracket 84. The ball end 110 of stem 106 acts on socket of adjusting lever 112 pivoted on headed stud 114 and bearing on the leaf springs 98, 100. Rotation of the knob is limited to less than 360° by pin 116 in bracket 84 and projecting into the path of land 118 on the underside of the knob. It will be apparent that control lever 82 is regulated by bellows 92 in opposition to the leaf springs 98, 100. The movement of the control lever is naturally affected by the adjustment of knob 104 and springs 98, 100.

The movement of lever 82 is imparted to operating pin 80 through leaf spring 120 on the underside of the lever and engaged between adjustable shoulders 122, 124 carried on the pin 80. The leaf spring 120 normally follows the control lever 82 except when the lever moves to the "off" position when the spring moves slightly from the lever to hold valve 18 closed with a slight bias and eliminates the need for extreme precision in manufacture.

The movement of control lever 82 would normally be of a modulating type over the entire range of movement due to the nature of the bellows action. The modulation action is modified to provide a snap-off action from low fire and a snap-on action to a valve position passing more fuel than low fire. The modification of lever action is secured by means of the cam and follower mechanism appearing at the right end of the control lever. The cam 126 is mounted on the housing wall and the roller-type follower 128 is carried by arm 130 pivoted on the end of lever 82 on pin 132 and urged into contact with the cam by spring 134 tensioned between arm 130 and lever 82.

Figure 6:
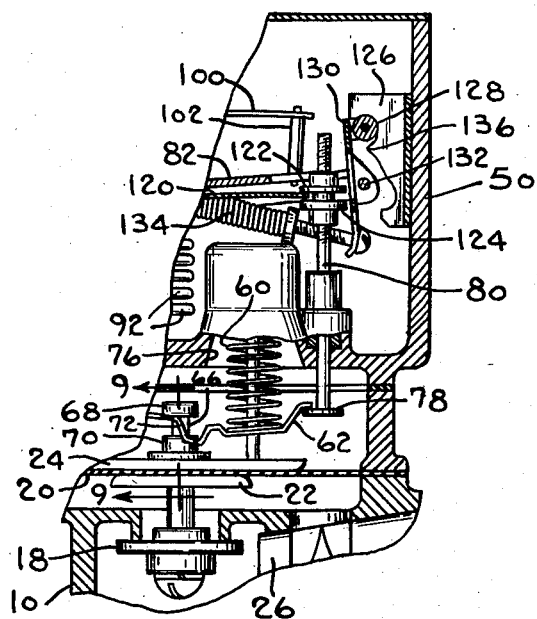
Fig. 6 is a fragmentary view similar to Fig. 1 showing the valve closed.
Figure 7:
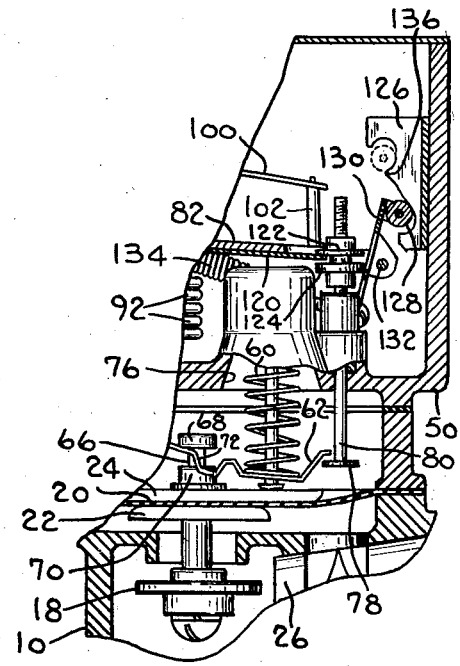
Fig. 7 is similar to Fig. 6 but shows the valve near high fire and (in dotted lines) the roller position prior to opening the valve.
Figure 8:
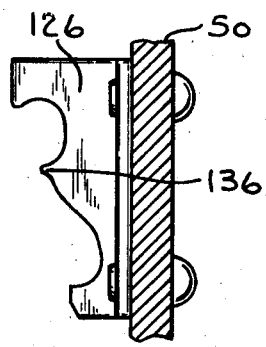
Fig. 8 is an enlarged view of the cam.
Figure 9:
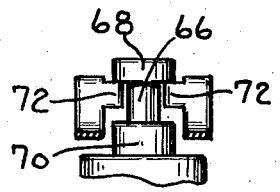
Fig. 9 is an enlarged view showing the connection between lever 62 and valve stem 66.

When roller or follower 128 is in the lowermost position of the cam the valve 18 is in its high fire range (Fig. 7, solid lines) and when the follower is at the peak of the cam the valve is at low fire (Fig. 1). The bellows may modulate the valve in this range to match heat output to heat demand. If the output at low fire causes the room temperature to continue to rise the bellows tends to close the valve. However, the bellows must build up enough force to move roller 128 over the small nib 136 on the cam. When sufficient force has built up in the bellows the roller will snap over the nib and the bellows will drive the control lever 82 to the "off" position (Fig. 6 or Fig. 7, dotted lines) in which lever spring 120 holds pin 80 in its uppermost position. When the room temperature subsequently falls off a force differential must again be built up to move the roller from the roller from the "off" position in Fig. 7 (dotted lines). Thus, as the bellows collapses due to cooling of the bulb, springs 98, 100 act to unbalance the forces acting on lever 82. When the roller does move from the "off" position the downward and outward slope of the modulating portion of the cam acts as a negative spring rate to insure moving the roller to or close to the high fire position (Fig. 7) with a snap action. Ideally the lever should be snapped to high fire but in practice it does not always reach that point. Ignition will safely take place and the bellows will be free to modulate the valve 18 immediately.

By way of example, a control such as this may be at high fire at 69° and at low fire at 72°. If low fire heat output drives the room temperature up the control would snap to "off" at 75° and when the room temperature subsequently drops to 70° the control will snap on to the ignition level (which may be high fire, or a little less than high fire). With this in mind it will be appreciated that the present control modulates the heat output to satisfy demand and will automatically snap off when the room temperature rises to a predetermined temperature. The valve will remain closed until the room temperature drops to a predetermined low temperature at which time the valve will be snapped open to at least fifty percent of the high fire opening. In cold weather the control will not snap off at all and practically straight line temperature will be maintained in the heated space. The knob 104 may, of course, be adjusted to vary the temperature given in the above example upwards or downwards as desired.

Variations in the structure will occur to those skilled in the art and equivalent apparatus may be substituted for various components without departing from the spirit of this invention. Accordingly, this invention is to be limited only by the scope of the claims.

We claim:

1. A gas control valve comprising, a valve body having an inlet and an outlet, a valve in the body for controlling flow from the inlet to the outlet, means mounting the valve for limited free movement within the valve body, lever means operatively connected to said valve to regulate valve movement, said lever means including first and second pivoted lever members, biasing means acting on the first lever member, charged bellows means acting on the first lever member in opposition to said biasing means and responsive to the temperature of the heated medium to exert an increasing force with an increase in response temperature, means providing a lost motion connection between said second lever member and said valve, means for positioning the second lever member with respect to said valve to thereby modulate the effective range of movement of said valve in response to temperature changes, said last-mentioned means including a pin carried by the first lever member and having at its free end a shoulder which underlies the free end of the second pivoted lever member, and spring means biasing the second lever into engagement with the shoulder on said pin, a cam member, a cam follower member, one of the first members being mounted in the lever member and the other member being stationary, said cam being shaped to cause the first lever member to dwell as it moves toward the "off" position at a low fire position and to subsequently snap to "off" if the response temperature of the bellows means continues to rise and to cause the first lever member to dwell at the "off" position until said response temperature drops to a predetermined temperature whereupon the first lever member snaps to a position in which the flow rate of the valve is greater than the rate at said low fire position.

2. The structure described in claim 1 wherein said pin is dimensioned with respect to valve opening movement of said second lever member so as to move said shoulder clear of said second lever when the latter is in a position corresponding to full open position of the valve, whereby to transfer the bias of said spring means from said pin to said valve.

References Cited in the file of this patent

UNITED STATES PATENTS

| | | |
|---|---|---|
| 1,895,650 | Carmean | Jan. 31, 1933 |
| 2,116,605 | Kelly | May 10, 1938 |
| 2,437,468 | Hunter | Mar. 9, 1948 |

FOREIGN PATENTS

| | | |
|---|---|---|
| 317,677 | Great Britain | Aug. 22, 1929 |